(12) United States Patent
Kusens et al.

(10) Patent No.: US 11,721,190 B2
(45) Date of Patent: *Aug. 8, 2023

(54) UTILIZING ARTIFICIAL INTELLIGENCE TO DETECT OBJECTS OR PATIENT SAFETY EVENTS IN A PATIENT ROOM

(71) Applicant: CERNER INNOVATION, INC., Kansas City, KS (US)

(72) Inventors: Bruce Howard Kusens, North Miami Beach, FL (US); Michael Kusens, Cooper City, FL (US)

(73) Assignee: Cerner Innovation, Inc., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,942

(22) Filed: Jan. 4, 2022

(65) Prior Publication Data

US 2022/0130225 A1 Apr. 28, 2022

Related U.S. Application Data

(63) Continuation of application No. 17/117,414, filed on Dec. 10, 2020, now Pat. No. 11,276,291, which is a
(Continued)

(51) Int. Cl.
*H04N 13/204* (2018.01)
*G08B 21/04* (2006.01)
(Continued)

(52) U.S. Cl.
CPC ......... *G08B 21/0476* (2013.01); *G06V 20/52* (2022.01); *G08B 29/185* (2013.01); *H04N 13/204* (2018.05)

(58) Field of Classification Search
None
See application file for complete search history.

(56) References Cited

U.S. PATENT DOCUMENTS 4,669,263 A 6/1987 Sugiyama
4,857,716 A 8/1989 Gombrich et al.
(Continued)

FOREIGN PATENT DOCUMENTS

AU 2014308590 3/2016
DE 19844918 A1 4/2000
(Continued)

OTHER PUBLICATIONS

US 9,948,899 B1, 04/2018, Kusens (withdrawn)
(Continued)

*Primary Examiner* — Eileen M Adams
(74) *Attorney, Agent, or Firm* — Kilpatrick Townsend & Stockton LLP (57) ABSTRACT

Methods and systems are provided for detecting objects or patient safety events in a patient room. Artificial intelligence is utilized to enhance safety issue recognition capabilities by the methods and systems. Sensors collect a series of images and depth data in a room of a patient. Data (corresponding to images and depth data of an object or patient safety event) is received from the sensors and compared to stored data to identify the object or patient safety event. The images are communicated to a central video monitoring system and a user may be prompted to confirm if the object requires learning or a patient safety event occurred (or identify the object or patient safety event) or to provide additional parameters or actions. A patient safety learning system analyzes the data and incorporates the user response to enhance safety issue recognition capabilities of the system and reduce false alerts.

17 Claims, 6 Drawing Sheets

Related U.S. Application Data continuation of application No. 16/832,790, filed on Mar. 27, 2020, now Pat. No. 10,922,946, which is a continuation of application No. 15/856,419, filed on Dec. 28, 2017, now Pat. No. 10,643,446.

(51) Int. Cl.
*G08B 29/18* (2006.01)
*G06V 20/52* (2022.01)

(56) References Cited

U.S. PATENT DOCUMENTS

| | | | |
|---|---|---|---|
| 5,031,228 A | 7/1991 | Lu | |
| 5,276,432 A | 1/1994 | Travis | |
| 5,448,221 A | 9/1995 | Weller | |
| 5,482,050 A | 1/1996 | Smokoff et al. | |
| 5,592,153 A | 1/1997 | Welling et al. | |
| 5,798,798 A | 8/1998 | Rector et al. | |
| 5,838,223 A | 11/1998 | Gallant et al. | |
| 5,915,379 A | 6/1999 | Wallace et al. | |
| 5,942,986 A | 8/1999 | Shabot et al. | |
| 6,050,940 A | 4/2000 | Braun et al. | |
| 6,095,984 A | 8/2000 | Amano et al. | |
| 6,160,478 A | 12/2000 | Jacobsen et al. | |
| 6,174,283 B1 | 1/2001 | Nevo et al. | |
| 6,188,407 B1 | 2/2001 | Smith et al. | |
| 6,269,812 B1 | 8/2001 | Wallace et al. | |
| 6,287,452 B1 | 9/2001 | Allen et al. | |
| 6,322,502 B1 | 11/2001 | Schoenberg et al. | |
| 6,369,838 B1 | 4/2002 | Wallace et al. | |
| 6,429,869 B1 | 8/2002 | Kamakura et al. | |
| 6,614,349 B1 | 9/2003 | Proctor et al. | |
| 6,727,818 B1 | 4/2004 | Wildman et al. | |
| 6,804,656 B1 | 10/2004 | Rosenfeld et al. | |
| 7,015,816 B2 | 3/2006 | Wildman et al. | |
| 7,122,005 B2 | 10/2006 | Shusterman | |
| 7,154,397 B2 | 12/2006 | Zerhusen et al. | |
| 7,237,287 B2 | 7/2007 | Weismiller et al. | |
| 7,323,991 B1 | 1/2008 | Eckert et al. | |
| 7,408,470 B2 | 8/2008 | Wildman et al. | |
| 7,420,472 B2 | 9/2008 | Tran | |
| 7,430,608 B2 | 9/2008 | Noonan et al. | |
| 7,502,498 B2 | 3/2009 | Wen et al. | |
| 7,612,679 B1 | 11/2009 | Fackler et al. | |
| 7,669,263 B2 | 3/2010 | Menkedick et al. | |
| 7,715,387 B2 | 5/2010 | Schuman | |
| 7,724,147 B2 | 5/2010 | Brown | |
| 7,756,723 B2 | 7/2010 | Rosow et al. | |
| 7,890,349 B2 | 2/2011 | Cole et al. | |
| 7,893,842 B2 | 2/2011 | Deutsch | |
| 7,895,055 B2 | 2/2011 | Schneider et al. | |
| 7,908,153 B2 | 3/2011 | Scherpbier et al. | |
| 7,945,457 B2 | 5/2011 | Zaleski | |
| 7,962,544 B2 | 6/2011 | Forok et al. | |
| 7,972,140 B2 | 7/2011 | Renaud | |
| 8,108,036 B2 | 1/2012 | Tran | |
| 8,123,685 B2 | 2/2012 | Brauers et al. | |
| 8,128,596 B2 | 3/2012 | Carter | |
| 8,190,447 B2 | 5/2012 | Hungerford et al. | |
| 8,224,108 B2 | 7/2012 | Steinberg et al. | |
| 8,237,558 B2 | 8/2012 | Seyed et al. | |
| 8,273,018 B1 | 9/2012 | Fackler et al. | |
| 8,432,263 B2 | 4/2013 | Kunz | |
| 8,451,314 B1 | 5/2013 | Cline et al. | |
| 8,529,448 B2 | 9/2013 | Mcnair | |
| 8,565,500 B2 | 10/2013 | Neff | |
| 8,620,682 B2 | 12/2013 | Bechtel et al. | |
| 8,655,680 B2 | 2/2014 | Bechtel et al. | |
| 8,700,423 B2 | 4/2014 | Eaton et al. | |
| 8,727,981 B2 | 5/2014 | Bechtel et al. | |
| 8,769,153 B2 | 7/2014 | Dziubinski | |
| 8,890,937 B2 | 11/2014 | Skubic et al. | |
| 8,902,068 B2 | 12/2014 | Bechtel et al. | |
| 8,917,186 B1 | 12/2014 | Grant | |
| 8,953,886 B2 | 2/2015 | King et al. | |
| 9,072,929 B1 | 7/2015 | Rush et al. | |
| 9,129,506 B1 | 9/2015 | Kusens | |
| 9,147,334 B2 | 9/2015 | Long | |
| 9,159,215 B1 | 10/2015 | Kusens | |
| 9,269,012 B2 | 2/2016 | Fotland | |
| 9,292,089 B1 | 3/2016 | Sadek | |
| 9,305,191 B2 | 4/2016 | Long et al. | |
| 9,367,270 B1 | 6/2016 | Robertson | |
| 9,408,561 B2 | 8/2016 | Stone et al. | |
| 9,424,699 B2 | 8/2016 | Kusens et al. | |
| 9,466,163 B2 | 10/2016 | Kusens et al. | |
| 9,489,820 B1 | 11/2016 | Kusens | |
| 9,519,969 B1 | 12/2016 | Kusens | |
| 9,524,443 B1 | 12/2016 | Kusens | |
| 9,536,310 B1 | 1/2017 | Kusens | |
| 9,538,158 B1 | 1/2017 | Rush et al. | |
| 9,563,955 B1 | 2/2017 | Kamarshi et al. | |
| 9,597,016 B2 | 3/2017 | Stone et al. | |
| 9,691,206 B2 | 6/2017 | Kusens et al. | |
| 9,729,833 B1 | 8/2017 | Kusens | |
| 9,741,227 B1 | 8/2017 | Kusens | |
| 9,774,991 B2 | 9/2017 | Kusens | |
| 9,838,849 B2 | 12/2017 | Kusens | |
| 9,858,741 B2 | 1/2018 | Kusens et al. | |
| 9,892,310 B2 | 2/2018 | Kusens et al. | |
| 9,892,311 B2 | 2/2018 | Kusens et al. | |
| 9,892,611 B1 | 2/2018 | Kusens | |
| 9,905,113 B2 | 2/2018 | Kusens | |
| 9,934,427 B2 | 4/2018 | Derenne et al. | |
| 9,984,521 B1 | 5/2018 | Kusens et al. | |
| 9,997,001 B2 | 6/2018 | Kusens et al. | |
| 9,998,857 B2 | 6/2018 | Kusens | |
| 10,013,831 B1 | 7/2018 | Kusens et al. | |
| 10,055,961 B1 | 8/2018 | Johnson et al. | |
| 10,068,116 B2 | 9/2018 | Good et al. | |
| 10,078,956 B1 | 9/2018 | Kusens | |
| 10,090,068 B2 | 10/2018 | Kusens et al. | |
| 10,091,463 B1 | 10/2018 | Kusens | |
| 10,096,223 B1 | 10/2018 | Kusens | |
| 10,109,179 B2 | 10/2018 | Kusens | |
| 10,115,253 B2 | 10/2018 | Kusens et al. | |
| 10,115,254 B1 | 10/2018 | Kusens et al. | |
| 10,121,299 B2 | 11/2018 | Kusens et al. | |
| 10,210,378 B2 | 2/2019 | Kusens et al. | |
| 10,225,522 B1 | 3/2019 | Kusens | |
| 10,276,019 B2 | 4/2019 | Johnson et al. | |
| 10,303,924 B2 | 5/2019 | Kusens et al. | |
| 10,342,478 B2 | 7/2019 | Kusens | |
| 10,410,042 B2 | 9/2019 | Kusens et al. | |
| 10,524,722 B2 | 1/2020 | Kusens et al. | |
| 10,614,288 B2 | 4/2020 | Kusens et al. | |
| 10,643,061 B2 | 5/2020 | Kusens et al. | |
| 10,643,446 B2 * | 5/2020 | Kusens | G08B 25/08 |
| 10,878,220 B2 | 12/2020 | Kusens | |
| 10,922,936 B2 | 2/2021 | Kusens et al. | |
| 10,922,946 B2 * | 2/2021 | Kusens | G08B 21/0476 |
| 11,241,169 B2 | 2/2022 | Kusens et al. | |
| 11,276,291 B2 * | 3/2022 | Kusens | H04N 13/204 |
| 2002/0015034 A1 | 2/2002 | Malmborg | |
| 2002/0038073 A1 | 3/2002 | August | |
| 2002/0077863 A1 | 6/2002 | Rutledge et al. | |
| 2002/0101349 A1 | 8/2002 | Rojas | |
| 2002/0115905 A1 | 8/2002 | August | |
| 2002/0183976 A1 | 12/2002 | Pearce | |
| 2003/0037786 A1 | 2/2003 | Biondi et al. | |
| 2003/0070177 A1 | 4/2003 | Kondo et al. | |
| 2003/0092974 A1 | 5/2003 | Santoso et al. | |
| 2003/0095147 A1 | 5/2003 | Daw | |
| 2003/0108223 A1 | 6/2003 | Prokoski | |
| 2003/0135390 A1 | 7/2003 | Obrien et al. | |
| 2003/0140928 A1 | 7/2003 | Bui et al. | |
| 2003/0227386 A1 | 12/2003 | Pulkkinen et al. | |
| 2004/0019900 A1 | 1/2004 | Knightbridge et al. | |
| 2004/0052418 A1 | 3/2004 | Delean | |
| 2004/0054760 A1 | 3/2004 | Ewing et al. | |
| 2004/0097227 A1 | 5/2004 | Siegel | |
| 2004/0116804 A1 | 6/2004 | Mostafavi | |
| 2004/0193449 A1 | 9/2004 | Wildman et al. | |
| 2005/0038326 A1 | 2/2005 | Mathur | |

(56) References Cited

U.S. PATENT DOCUMENTS

| | | |
|---|---|---|
| 2005/0182305 A1 | 8/2005 | Hendrich |
| 2005/0231341 A1 | 10/2005 | Shimizu |
| 2005/0249139 A1 | 11/2005 | Nesbit |
| 2006/0004606 A1 | 1/2006 | Wendl et al. |
| 2006/0047538 A1 | 3/2006 | Condurso et al. |
| 2006/0049936 A1 | 3/2006 | Collins et al. |
| 2006/0058587 A1 | 3/2006 | Heimbrock et al. |
| 2006/0089541 A1 | 4/2006 | Braun et al. |
| 2006/0092043 A1 | 5/2006 | Lagassey |
| 2006/0107295 A1 | 5/2006 | Margis et al. |
| 2006/0145874 A1 | 7/2006 | Fredriksson et al. |
| 2006/0261974 A1 | 11/2006 | Albert et al. |
| 2007/0033072 A1 | 2/2007 | Bildirici |
| 2007/0083445 A1 | 4/2007 | Garcia et al. |
| 2007/0085690 A1 | 4/2007 | Tran |
| 2007/0118054 A1 | 5/2007 | Pinhas et al. |
| 2007/0120689 A1 | 5/2007 | Zerhusen et al. |
| 2007/0129983 A1 | 6/2007 | Scherpbier et al. |
| 2007/0136102 A1 | 6/2007 | Rodgers |
| 2007/0136218 A1 | 6/2007 | Bauer et al. |
| 2007/0159332 A1 | 7/2007 | Koblasz |
| 2007/0279219 A1 | 12/2007 | Warriner |
| 2007/0296600 A1 | 12/2007 | Dixon et al. |
| 2008/0001735 A1 | 1/2008 | Tran |
| 2008/0001763 A1 | 1/2008 | Raja et al. |
| 2008/0002860 A1 | 1/2008 | Super et al. |
| 2008/0004904 A1 | 1/2008 | Tran |
| 2008/0009686 A1 | 1/2008 | Hendrich |
| 2008/0015903 A1 | 1/2008 | Rodgers |
| 2008/0021731 A1 | 1/2008 | Rodgers |
| 2008/0071210 A1 | 3/2008 | Moubayed et al. |
| 2008/0087719 A1 | 4/2008 | Sahud |
| 2008/0106374 A1 | 5/2008 | Sharbaugh |
| 2008/0126132 A1 | 5/2008 | Warner et al. |
| 2008/0228045 A1 | 9/2008 | Gao et al. |
| 2008/0249376 A1 | 10/2008 | Zaleski |
| 2008/0267447 A1 | 10/2008 | Kelusky et al. |
| 2008/0277486 A1 | 11/2008 | Seem et al. |
| 2008/0281638 A1 | 11/2008 | Weatherly et al. |
| 2009/0082829 A1 | 3/2009 | Panken et al. |
| 2009/0091458 A1 | 4/2009 | Deutsch |
| 2009/0099480 A1 | 4/2009 | Saigo et al. |
| 2009/0112630 A1 | 4/2009 | Collins et al. |
| 2009/0119843 A1 | 5/2009 | Rodgers et al. |
| 2009/0177327 A1 | 7/2009 | Turner et al. |
| 2009/0196510 A1 | 8/2009 | Gokturk et al. |
| 2009/0224924 A1 | 9/2009 | Thorp |
| 2009/0278934 A1 | 11/2009 | Ecker et al. |
| 2009/0322513 A1 | 12/2009 | Hwang et al. |
| 2009/0326340 A1 | 12/2009 | Wang et al. |
| 2010/0117836 A1 | 5/2010 | Seyed et al. |
| 2010/0169114 A1 | 7/2010 | Henderson et al. |
| 2010/0169120 A1 | 7/2010 | Herbst et al. |
| 2010/0172567 A1 | 7/2010 | Prokoski |
| 2010/0176952 A1 | 7/2010 | Bajcsy et al. |
| 2010/0188228 A1 | 7/2010 | Hyland |
| 2010/0205771 A1 | 8/2010 | Pietryga et al. |
| 2010/0245577 A1 | 9/2010 | Yamamoto et al. |
| 2010/0285771 A1 | 11/2010 | Peabody |
| 2010/0305466 A1 | 12/2010 | Corn |
| 2011/0018709 A1 | 1/2011 | Kornbluh |
| 2011/0022981 A1 | 1/2011 | Mahajan et al. |
| 2011/0025493 A1 | 2/2011 | Papadopoulos et al. |
| 2011/0025499 A1 | 2/2011 | Hoy et al. |
| 2011/0035057 A1 | 2/2011 | Receveur et al. |
| 2011/0035466 A1 | 2/2011 | Panigrahi |
| 2011/0050411 A1 | 3/2011 | Schuman et al. |
| 2011/0054936 A1 | 3/2011 | Cowan et al. |
| 2011/0068930 A1 | 3/2011 | Wildman et al. |
| 2011/0077965 A1 | 3/2011 | Nolte et al. |
| 2011/0087079 A1 | 4/2011 | Aarts |
| 2011/0087125 A1 | 4/2011 | Causevic |
| 2011/0102133 A1 | 5/2011 | Shaffer |
| 2011/0102181 A1 | 5/2011 | Metz et al. |
| 2011/0106560 A1 | 5/2011 | Eaton et al. |
| 2011/0106561 A1 | 5/2011 | Eaton et al. |
| 2011/0175809 A1 | 7/2011 | Markovic et al. |
| 2011/0190593 A1 | 8/2011 | Mcnair |
| 2011/0227740 A1 | 9/2011 | Wohltjen |
| 2011/0245707 A1 | 10/2011 | Castle et al. |
| 2011/0254682 A1 | 10/2011 | Sigrist |
| 2011/0288811 A1 | 11/2011 | Greene |
| 2011/0295621 A1 | 12/2011 | Farooq et al. |
| 2011/0301440 A1 | 12/2011 | Riley et al. |
| 2011/0313325 A1 | 12/2011 | Cuddihy |
| 2012/0016295 A1 | 1/2012 | Tsoukalis |
| 2012/0025991 A1 | 2/2012 | Okeefe et al. |
| 2012/0026308 A1 | 2/2012 | Johnson et al. |
| 2012/0075464 A1 | 3/2012 | Derenne et al. |
| 2012/0092162 A1 | 4/2012 | Rosenberg |
| 2012/0098918 A1 | 4/2012 | Murphy |
| 2012/0140068 A1 | 6/2012 | Monroe et al. |
| 2012/0154582 A1 | 6/2012 | Johnson et al. |
| 2012/0212582 A1 | 8/2012 | Deutsch |
| 2012/0259650 A1 | 10/2012 | Mallon et al. |
| 2012/0314901 A1 | 12/2012 | Hanson et al. |
| 2012/0323090 A1 | 12/2012 | Bechtel et al. |
| 2012/0323591 A1 | 12/2012 | Bechtel et al. |
| 2012/0323592 A1 | 12/2012 | Bechtel et al. |
| 2013/0027199 A1 | 1/2013 | Bonner |
| 2013/0028570 A1 | 1/2013 | Suematsu et al. |
| 2013/0120120 A1 | 5/2013 | Long et al. |
| 2013/0122807 A1 | 5/2013 | Fenarvitz et al. |
| 2013/0127620 A1 | 5/2013 | Siebers et al. |
| 2013/0184592 A1 | 7/2013 | Venetianer et al. |
| 2013/0265482 A1 | 10/2013 | Funamoto |
| 2013/0309128 A1 | 11/2013 | Voegeli et al. |
| 2013/0332184 A1 | 12/2013 | Burnham et al. |
| 2014/0039351 A1 | 2/2014 | Mix et al. |
| 2014/0070950 A1 | 3/2014 | Snodgrass |
| 2014/0081654 A1 | 3/2014 | Bechtel et al. |
| 2014/0085501 A1 | 3/2014 | Tran |
| 2014/0086450 A1 | 3/2014 | Huang et al. |
| 2014/0108041 A1 | 4/2014 | Bechtel et al. |
| 2014/0155755 A1 | 6/2014 | Pinter et al. |
| 2014/0168397 A1 | 6/2014 | Greco et al. |
| 2014/0191861 A1 | 7/2014 | Scherrer |
| 2014/0191946 A1 | 7/2014 | Cho et al. |
| 2014/0213845 A1 | 7/2014 | Bechtel et al. |
| 2014/0267625 A1 | 9/2014 | Clark et al. |
| 2014/0267736 A1 | 9/2014 | Delean |
| 2014/0309789 A1 | 10/2014 | Ricci |
| 2014/0327545 A1 | 11/2014 | Bolling et al. |
| 2014/0328512 A1 | 11/2014 | Gurwicz et al. |
| 2014/0333744 A1 | 11/2014 | Baym et al. |
| 2014/0333776 A1 | 11/2014 | Dedeoglu et al. |
| 2014/0354436 A1 | 12/2014 | Nix et al. |
| 2014/0365242 A1 | 12/2014 | Neff |
| 2015/0057635 A1 | 2/2015 | Bechtel et al. |
| 2015/0061891 A1 | 3/2015 | Oleson et al. |
| 2015/0109442 A1 | 4/2015 | Derenne et al. |
| 2015/0206415 A1 | 7/2015 | Wegelin et al. |
| 2015/0227680 A1 | 8/2015 | Mainkar et al. |
| 2015/0269318 A1 | 9/2015 | Neff |
| 2015/0278456 A1 | 10/2015 | Bermudez Rodriguez et al. |
| 2015/0294143 A1 | 10/2015 | Wells et al. |
| 2016/0022218 A1 | 1/2016 | Hayes et al. |
| 2016/0029160 A1 | 1/2016 | Theurer et al. |
| 2016/0070869 A1 | 3/2016 | Portnoy |
| 2016/0093195 A1 | 3/2016 | Ophardt |
| 2016/0098676 A1 | 4/2016 | Kusens et al. |
| 2016/0127641 A1 | 5/2016 | Gove |
| 2016/0180668 A1 | 6/2016 | Kusens et al. |
| 2016/0183864 A1 | 6/2016 | Kusens et al. |
| 2016/0217347 A1 | 7/2016 | Mineo |
| 2016/0253802 A1 | 9/2016 | Venetianer et al. |
| 2016/0267327 A1 | 9/2016 | Franz et al. |
| 2016/0285416 A1 | 9/2016 | Tiwari et al. |
| 2016/0314258 A1 | 10/2016 | Kusens |
| 2016/0324460 A1 | 11/2016 | Kusens |
| 2016/0360970 A1 | 12/2016 | Tzvieli et al. |
| 2017/0055917 A1 | 3/2017 | Stone et al. |
| 2017/0084158 A1 | 3/2017 | Kusens |
| 2017/0091562 A1 | 3/2017 | Kusens |

(56) References Cited

U.S. PATENT DOCUMENTS

| | | |
|---|---|---|
| 2017/0109991 A1 | 4/2017 | Kusens |
| 2017/0116473 A1 | 4/2017 | Sashida et al. |
| 2017/0143240 A1 | 5/2017 | Stone et al. |
| 2017/0163949 A1 | 6/2017 | Suzuki |
| 2017/0193177 A1 | 7/2017 | Kusens |
| 2017/0193279 A1 | 7/2017 | Kusens et al. |
| 2017/0193772 A1 | 7/2017 | Kusens et al. |
| 2017/0195637 A1 | 7/2017 | Kusens et al. |
| 2017/0214902 A1 | 7/2017 | Braune |
| 2017/0289503 A1 | 10/2017 | Kusens |
| 2017/0337682 A1* | 11/2017 | Liao ............... A61B 5/7267 |
| 2018/0018864 A1* | 1/2018 | Baker ............... G08B 21/043 |
| 2018/0068545 A1 | 3/2018 | Kusens |
| 2018/0104409 A1 | 4/2018 | Bechtel et al. |
| 2018/0114053 A1 | 4/2018 | Kusens et al. |
| 2018/0116528 A1 | 5/2018 | Tzvieli et al. |
| 2018/0137340 A1 | 5/2018 | Kusens et al. |
| 2018/0144605 A1 | 5/2018 | Kusens |
| 2018/0189946 A1 | 7/2018 | Kusens et al. |
| 2018/0190098 A1 | 7/2018 | Kusens |
| 2018/0357875 A1 | 12/2018 | Kusens |
| 2019/0006046 A1 | 1/2019 | Kusens et al. |
| 2019/0029528 A1 | 1/2019 | Tzvieli et al. |
| 2019/0043192 A1 | 2/2019 | Kusens et al. |
| 2019/0057592 A1 | 2/2019 | Kusens |
| 2019/0122028 A1 | 4/2019 | Kusens et al. |
| 2019/0205630 A1 | 7/2019 | Kusens |
| 2019/0206218 A1 | 7/2019 | Kusens et al. |
| 2019/0209022 A1 | 7/2019 | Sobol et al. |
| 2019/0228866 A1 | 7/2019 | Weffers-Albu et al. |
| 2019/0253668 A1 | 8/2019 | Kusens |
| 2019/0261915 A1 | 8/2019 | Kusens |
| 2019/0307405 A1 | 10/2019 | Terry et al. |
| 2019/0318149 A1 | 10/2019 | Kusens et al. |
| 2019/0318478 A1 | 10/2019 | Kusens et al. |
| 2020/0050844 A1 | 2/2020 | Kusens |
| 2020/0210679 A1 | 7/2020 | Kusens et al. |
| 2020/0226905 A1 | 7/2020 | Kusens et al. |
| 2021/0090420 A1 | 3/2021 | Kusens et al. |
| 2021/0202052 A1 | 7/2021 | Bechtel et al. |

FOREIGN PATENT DOCUMENTS

| | | |
|---|---|---|
| WO | 2007/081629 A2 | 7/2007 |
| WO | 2009/018422 A1 | 2/2009 |
| WO | 2012/122002 A1 | 9/2012 |
| WO | 2016126845 | 8/2016 |
| WO | 2017058991 | 4/2017 |
| WO | 2017124056 | 7/2017 |
| WO | 2018/218286 A1 | 12/2018 |

OTHER PUBLICATIONS

Camera System is Part of an Automated Hand Hygiene Monitoring System, Infection Control Today, Jul. 15, 2011, pp. 1-6.

Notice of Allowance received for U.S. Appl. No. 16/410,745, dated Jan. 4, 2022, 10 pages.

Virtual Patient Observation: Centralize Monitoring of High-Risk Patients with Video-, Cisco Video Surveillance Manager, 2013, pp. 1-6.

Conaire et al., "Fusion of Infrared and Visible Spectrum Video for Indoor Surveillance", WIAMIS, Apr. 2005, 4 pages.

Hong, Eliane, "[WOHIT] Hand Hygiene Being Taught in Hospitals via Social Gaming", L'Atelier BNP Paribas, Health, Apr. 2014, 6 pages.

Mooney, Tom, "Rhode Island ER First to Test Google Glass on Medical Conditions", EMS1, retrived from <https://www.ems1.com/ems-products/technology/articles/1860487-Rhode-Island-ER-first-to-test-Google-Glass-on-medical-conditions/>, Mar. 10, 2014, 3 pages.

Quan et al., "Facial Asymmetry Analysis Based on 3-D Dynamic Scans", 2012 IEEE International Conference on Systems, Man, and Cybernetics; COEX, Seoul, Korea; DOI: 10.1109/ICSMC.2012.6378151, Oct. 14-17, 2012, pp. 2676-2681.

Raheja et al., "Human Facial Expression Detection From Detected in Captured Image Using Back Propagation Neural Network", International Journal of Computer Science and Information Technology (IJCSIT), vol. 2, No. 1, Feb. 2010, pp. 116-123.

Non-Final Office Action received for U.S. Appl. No. 17/152,403, dated Mar. 15, 2022, 10 pages.

Non-Final Office Action received for U.S. Appl. No. 17/101,639, dated Aug. 2, 2022, 13 pages.

Notice of Allowance received for U.S. Appl. No. 17/318,521, dated Aug. 31, 2022, 9 pages.

Otanasap et al., "Pre-Impact Fall Detection System Using Dynamic Threshold and 3D Bounding Box", SPIE.Digital Library, Proceedings vol. 10225, Eighth International Conference on Graphic and Image Processing (ICGIP 2016), Available online at: <https://doi.org/10.1117/12.2266822>, Feb. 8, 2017, pp. 1-6.

Zarka et al., "Real-Time Human Motion Detection and Tracking", IEEE, Available online at: <https://ieeexplore.ieee.org/document/4530098>, 2008, pp. 1-6.

* cited by examiner

UTILIZING ARTIFICIAL INTELLIGENCE TO DETECT OBJECTS OR PATIENT SAFETY EVENTS IN A PATIENT ROOM

CROSS REFERENCE TO RELATED APPLICATIONS

This application is a continuation of U.S. application Ser. No. 17/117,414, titled "Utilizing Artificial Intelligence to Detect Objects or Patient Safety Events in a Patient Room" and filed on Dec. 10, 2020, which is a continuation of U.S. Pat. No. 10,922,946, titled "Utilizing Artificial Intelligence to Detect Objects or Patient Safety Events in a Patient Room" and filed on Mar. 27, 2020, which is a continuation of U.S. Pat. No. 10,643,446, titled "Utilizing Artificial Intelligence to Detect Objects or Patient Safety Events in a Patient Room" and filed Dec. 28, 2017, the contents of which are hereby expressly incorporated by reference in their entireties.

BACKGROUND

Medical facilities, such as hospitals, face many challenges in addition to simply caring for patients. For example, securing patients and preventing safety events (e.g., stroke, seizure, getting out of bed, etc.) from occurring consumes many resources and current methods lack effectiveness. Although some medical facilities utilize cameras and/or sensors to monitor patients, current systems require subjective decision-making and are prone to error by the personnel monitoring the data received from the cameras and/or sensors. Additionally, in some situations, a patient may obtain an object the particular patient is not allowed (e.g., a gift from a visitor that might present health or safety risks to the patient) that the current methods are unable to automatically detect. Accordingly, overall security for patients and equipment suffers and the many resources currently being utilized are wasted.

BRIEF SUMMARY

This brief summary is provided as a general overview of the more detailed disclosure which follows. It is not intended to identify key or essential elements of the disclosure, or to define the claim terms in isolation from the remainder of the disclosure, including the drawings.

This disclosure generally relates to methods and systems for detecting objects or patient safety events in a patient room. More particularly, artificial intelligence or machine learning is utilized to enhance safety issue recognition capabilities by the methods and systems. Generally, and without limitation, the sensors collect a series of images and depth data in a room of a patient. Data (corresponding to images and depth data of an object or patient safety event) is received from the sensors and compared to stored data to identify an object or patient safety event. The images of the object or patient safety event are communicated to a central video monitoring system and a user may be prompted to confirm if the object requires learning or a patient safety event occurred (or to identify the object or patient safety event so a patient safety learning system learns continuously). In some embodiments, the user may change the identification that the system originally produced if it is incorrect to further train the patient safety learning system. The patient safety learning system analyzes the data and incorporates the user response to enhance safety issue recognition capabilities of the system and reduce false alerts.

In some aspects, this disclosure relates to a system for utilizing artificial intelligence to detect objects or patient safety events in a patient room. The system comprises: one or more motion sensors located to collect a series of images of a room of a patient; a computerized patient safety monitoring system communicatively coupled to the one or more motion sensors, the computerized monitoring system receiving data from the one or more motion sensors and comparing the data to stored data in a database to identify an object or patient safety event; and a central video monitoring system that receives images of the object or patient safety event from the computerized patient safety monitoring system and prompts a user to confirm the object requires learning or the patient safety event occurred; and a patient safety learning system that analyzes the data and incorporates whether the object requires learning or the patient safety event occurred to enhance safety issue recognition capabilities of the system and reduce false alerts.

In some aspects this disclosure relates to computer-readable storage media having embodied thereon computer-executable instructions. When executed by one or more computer processors, the instructions may cause the processors to: utilize one or more motion sensors to collect a series of images of a room of a patient; receive data from the one or more motion sensors at a computerized patient safety monitoring system, the computerized patient safety monitoring system communicatively coupled to the one or more motion sensors; compare the data to stored data in a database to identify an object or patient safety event; communicate, to a central video monitoring system, images of the object or patient safety event from the computerized patient safety monitoring system; and analyze, by a patient safety learning system, the data to enhance safety issue recognition capabilities of the system and reduce false alerts.

In some aspects, this disclosure relates to a method for utilizing artificial intelligence to detect objects or patient safety events in a patient room. The method comprises: utilizing one or more motion sensors to collect a series of images of a room of a patient; receiving data from the one or more motion sensors at a computerized patient safety monitoring system, the computerized patient safety monitoring system communicatively coupled to the one or more motion sensors; comparing the data to stored data in a database to identify an object or patient safety event; receiving, by a central video monitoring system, images of the object or patient safety event from the computerized patient safety monitoring system; prompting, at the central video monitoring system, a user to identify the object that requires learning or identify the patient safety event that occurred and to add additional parameters to the object or patient safety event; and analyzing, by a patient safety learning system, the data and incorporating the identification of the object that requires learning or the identification of the patient safety event that occurred to enhance safety issue recognition capabilities of the system and reduce false alerts.

Additional objects, advantages, and novel features of the disclosure will be set forth in part in the description which follows, and in part will become apparent to those skilled in the art upon examination of the following, or may be learned by practice of the disclosure.

BRIEF DESCRIPTION OF THE SEVERAL VIEWS OF THE DRAWING

The description references the attached drawing figures, wherein.

DETAILED DESCRIPTION

As noted in the Background, medical facilities, such as hospitals, face many challenges in addition to simply caring for patients. For example, securing patients and preventing safety events (e.g., stroke, seizure, getting out of bed, etc.) from occurring consumes many resources and current methods lack effectiveness. Although some medical facilities utilize cameras and/or sensors to monitor patients, current systems require subjective decision-making and are prone to error by the personnel monitoring the data received from the cameras and/or sensors. Additionally, in some situations, a patient may obtain an object the particular patient is not allowed (e.g., a gift from a visitor that might present health or safety risks to the patient) that the current methods are unable to automatically detect. Accordingly, overall security for patients and equipment suffers and the many resources currently being utilized are wasted.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
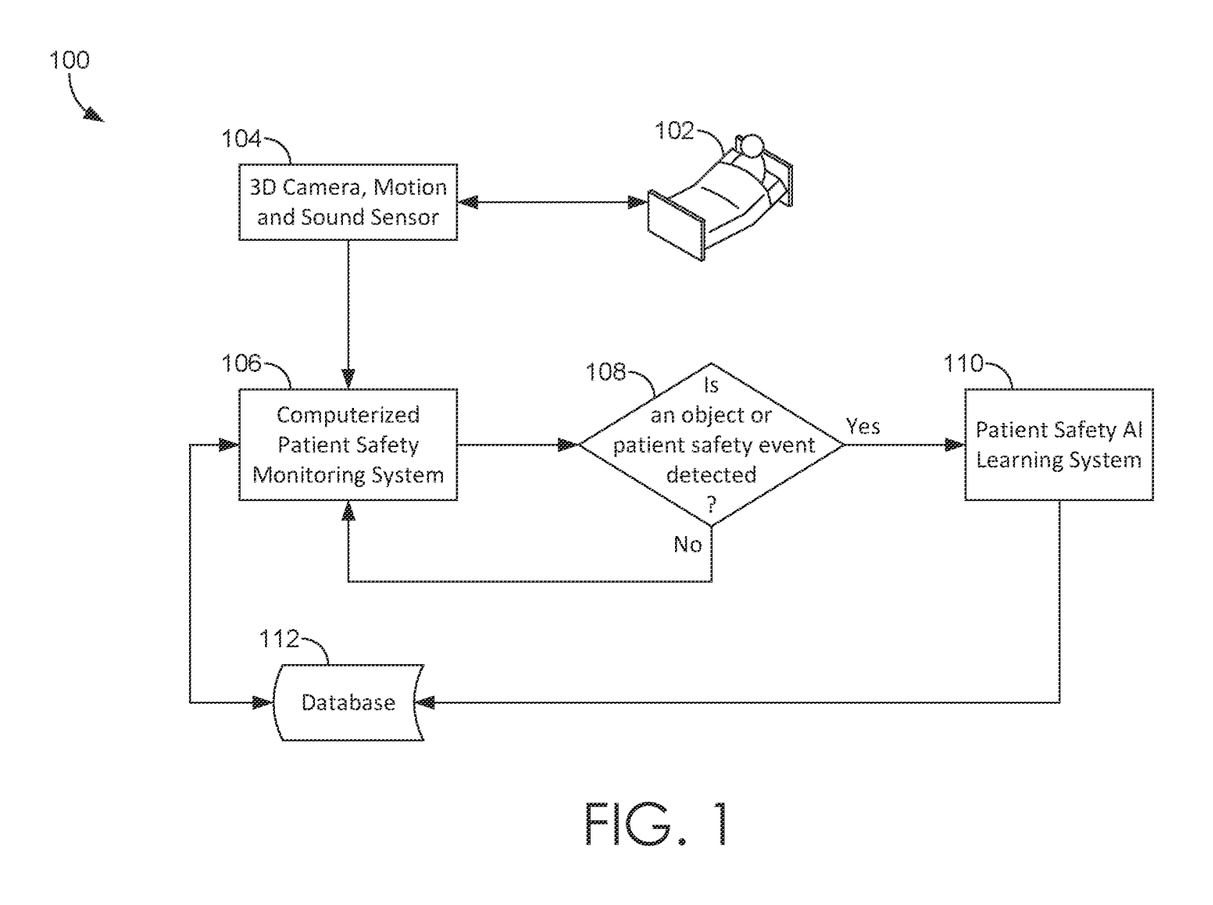
FIG. 1 is an exemplary flowchart for an automated learning process to detect objects or patient safety events in a patient room, in accordance with embodiments of the present disclosure.

Referring initially to FIG. 1, an automated learning process detects objects or patient safety events in a patient room, in accordance with embodiments of the present disclosure. As shown in FIG. 1, a system 100 for utilizing artificial intelligence to detect objects or patient safety events in a patient room may include one or more 3D motion sensors 104. Although described as 3D motion sensors, it is contemplated that aspects of the present invention may be accomplished using 2D motion sensors rather than 3D motion sensors. A 3D motion sensor is an electronic device that contains one or more cameras capable of identifying individual objects, people and motion. The 3D motion sensor may further contain one or more microphones to detect audio. The cameras can utilize technologies including but not limited to color RGB, CMOS sensors, lasers, infrared projectors and RF-modulated light. The 3D motion sensor may have one or more integrated microprocessors and/or image sensors to detect and process information both transmitted from and received by the various cameras. Exemplary 3D motion sensors include the Microsoft® Kinect® Camera, the Sony® PlayStation® Camera, the Intel® RealSense™ Camera, the Orbbec® Persee®, the Orbbec® Astra®, and the Asus® Ztion, each of which happens to include microphones, although sound capture is not essential to the practice of the disclosure. A user may be able to configure alerts based on data that is received from the 3D motion sensor 204 and interpreted by the computerized patient monitoring system 106. For example, a user can configure the computerized patient monitoring system 106 to provide alerts based on data the computerized patient monitoring system 106 has interpreted to detect objects or patient safety events.

As used herein, "a sensor" and "sensors" are used interchangeably in the singular and plural unless expressly described as a singular sensor or an array of sensors. A singular sensor may be used, or a sensor may comprise two or more cameras integrated into a single physical unit. Alternately, two or more physically distinct sensors may be used, or two or more physically distinct arrays of sensors may be used.

An "object" may be any object in the room of a patient being monitored that presents safety or medical issues to the patient. For example, the object may be a gift the patient received that heightens the risk for aggravating a condition that patient is being treated for. The "object" may also be medical equipment or devices in the room of the patient being monitored. For example, the object may be an infusion pump or a pole that supports the infusion pump and bag. The object may also include contraband, such as weapons or drugs.

A "patient safety event" may be any action (e.g., getting out of bed), activity, condition, symptom, or inferred diagnosis (e.g., stroke or seizure) that presents safety or medical issues to the patient.

As shown in FIG. 1, the system 100 may be utilized to collect a series of images in the room of a patient 102. For example, 3D motion sensor 104 may detect an object (e.g., medication, food, beverage, drug paraphernalia, tobacco products, and the like) in the room of the patient. Additionally, or alternatively, 3D motion sensor 104 may detect a patient safety event (e.g., the patient getting out of bed). Computerized patient safety monitoring system 106 is communicatively coupled to the 3D motion sensor 104 and receives data (i.e., the series of images relevant to the object or patient safety issue) from the 3D motion sensor 104. Features of the object or patient safety event may be analyzed by computerized patient safety monitoring system 106 and compared to stored data in a database 112 to identify known issues, patterns, and the like that can be used to detect an object or patient safety event.

If the object requires learning or the patient safety event occurred, as shown at 108, the data is communicated to a patient safety learning system 110. The patient safety learning system 110 analyzes the data (i.e., the video and depth data captured by the sensor 104) and stores new or modified issues, patterns, and the like that can be used to detect an object or patient safety event in database 112. This automated learning process enhances the safety issue recognition capabilities of the system and reduces false alerts. If, on the other hand, no object or patient safety event is detected, no further action is taken and the computerized patient safety monitoring system 106 continues to wait for data received by the 3D sensor 104.

In embodiments, the 3D motion sensor 104 may be co-located with a patient 102 to be monitored. The patient 102 to be monitored may be monitored in a variety of environments, including, without limitation, a hospital, a home, a hospice care facility, a nursing home, an assisted living facility, an outpatient medical care facility, and the like. The 3D motion sensor 104 may be positioned where it is likely to capture images of the face of the patient 102 to be monitored. For example, a 3D motion sensor 104 may be oriented to take images of a bed, chair, or other location where the patient 102 to be monitored may spend a significant amount of time. In some embodiments, the 3D motion sensor 104 may be oriented to take images of persons and/or objects entering and exiting the room of the patient 102 to be monitored. In some embodiments, the 3D motion sensor 104 may be oriented to take images of items or equipment (e.g., medical devices) that may be located in the room of the patient 102 to be monitored. The 3D motion sensor 104 may be permanently installed, or may be temporarily set up in a room as needed. The patient 102 to be monitored may be under immediate medical care, e.g., in a medical facility under the supervision of a medical professional, or may not be under immediate care, e.g., in a home or other environment, possibly with a caregiver. A caregiver may be a medical professional or paraprofessional, such as an orderly, nurse's aide, nurse, or the like. A caregiver may also be a friend, relative, individual, company, or facility that provides assistance with daily living activities and/or medical care for individuals, such as individuals who are disabled, ill, injured, elderly, or otherwise in need of temporary or long-term assistance. In some instances, the person to be monitored may be self-sufficient and not under the immediate care of any other person or service provider.

The 3D motion sensor 104 may communicate data (i.e., the video and depth data captured by the sensor 104), such as images of the patient 102 being monitored or an object detected in the room, to a computerized patient safety monitoring system 106. The computerized patient safety monitoring system 106 is a computer programmed to monitor transmissions of data from the 3D motion sensor 104. The computerized patient safety monitoring system 106 may be integral to the 3D motion sensor 104 or a distinctly separate apparatus from the 3D motion sensor 104, possibly in a remote location from 3D motion sensor 104 provided that the computerized patient safety monitoring system 106 can receive data from the 3D motion sensor 104. The computerized patient safety monitoring system 106 may be located in the monitored person's room, such as a hospital room, bedroom, or living room. The computerized patient safety monitoring system 106 may be connected to a central video monitoring system (e.g., central video monitoring system 210 described below with respect to FIG. 2). The computerized patient safety monitoring system 106 and central video monitoring system may be remotely located at any physical locations so long as a data connection exists (USB, TCP/IP or comparable) between the computerized patient safety monitoring system 106, the central video monitoring system, and the 3D motion sensor(s) 104.

The computerized patient safety monitoring system 106 may receive data from 3D motion sensor 104 for a monitoring zone (i.e., the patient's room or area to be monitored). Computerized patient monitoring and object recognition system 106 may assign reference points to distinctive features of a person or object. It should be understood that the selection of the reference points may vary with the individual and/or the configuration of the monitoring system 100. Reference points may be configured automatically by the monitoring system 100, may be configured automatically by the monitoring system 100 subject to confirmation and/or modification by a system user, or may be configured manually by a system user. The reference points corresponding to the object may be compared to a database comprising reference points of known or acceptable objects or patient safety events. As described below, various machine learning and/or object recognition techniques may additionally be utilized by patient safety learning system 110 to recognize the object or patient safety event.

Figure 2:
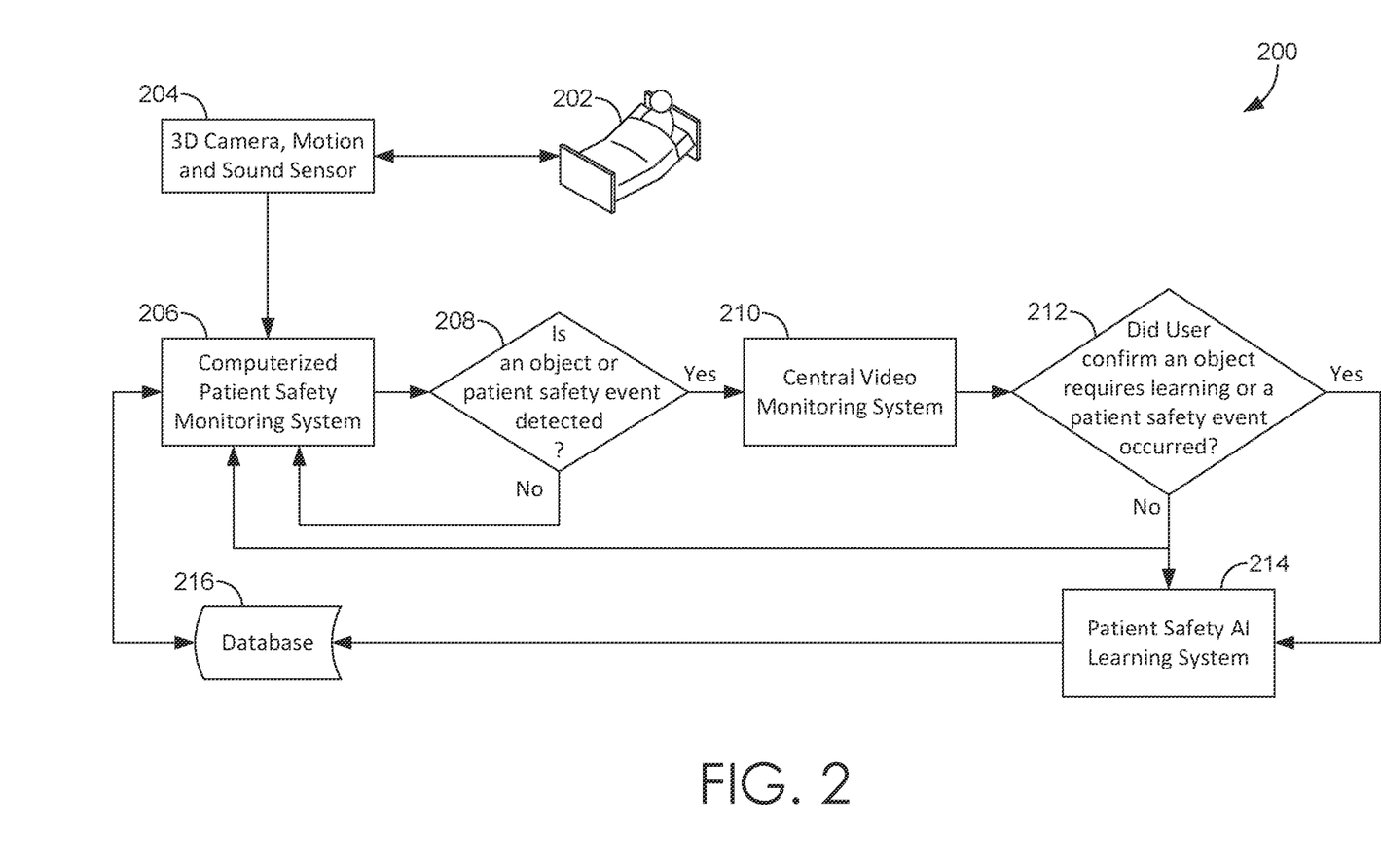
FIG. 2 is an exemplary flowchart for a semi-automated learning process to detect objects or patient safety events in a patient room, in accordance with embodiments of the present disclosure.

As shown in FIG. 2, a semi-automated learning process detects objects or patient safety events in a patient room, in accordance with embodiments of the present disclosure. The system 200 may be utilized to collect a series of images and depth data in the room of a patient 202. For example, 3D motion sensor 204 may detect an object (e.g., medication, food, beverage, drug paraphernalia, tobacco products, and the like) in the room of the patient. Additionally, or alternatively, 3D motion sensor 204 may detect a patient safety event (e.g., the patient getting out of bed). Computerized patient safety monitoring system 206 is communicatively coupled to the 3D motion sensor 204 and receives data (i.e., the series of images relevant to the object or patient safety issue) from the 3D motion sensor 204. Features of the object or patient safety event may be analyzed by computerized patient safety monitoring system 206 and compared to stored data in a database 216 to identify known issues, patterns, and the like that can be used to detect an object or patient safety event.

When an object or patient safety event is detected, images of the object or patient safety event are communicated, as shown at 208, by the computerized patient safety monitoring system 206 to the central video monitoring system 210. At the central video monitoring system 210, a user is prompted, as shown at step 212, to confirm the object requires learning (if not already known by the system 200) or to confirm the patient safety event occurred. This process can occur in real-time or any time in the future. For example, the detected object or patient safety event's video and depth data may be recorded and displayed for a user at the central video monitoring system to be played back so the user can provide additional information or confirmation at any time. If the object requires learning or the patient safety event occurred, the data is communicated to a patient safety learning system 214. The patient safety learning system 214 incorporates the response by the user so the object or patient safety event can be learned and stored in database 216. This semi-automated learning process enhances the safety issue recognition capabilities of the system and reduces false alerts. If, on the other hand, the object does not require learning or the patient safety event did not occur, no further action is taken and the computerized patient safety monitoring system 206 continues to wait for data received by the 3D sensor 204.

The 3D motion sensor 204 may communicate data, such as images of the patient 202 being monitored (e.g., via skeletal tracking or blob recognition) or an object detected in the room, to a computerized patient monitoring system 206. The computerized patient monitoring system 206 is a computer programmed to monitor transmissions of data from the 3D motion sensor 204. The computerized patient monitoring system 206 may be integral to the 3D motion sensor 204 or a distinctly separate apparatus from the 3D motion sensor 204, possibly in a remote location from 3D motion sensor 204 provided that the computerized patient monitoring system 206 can receive data from the 3D motion sensor 204. The computerized patient monitoring system 206 may be located in the monitored person's room, such as a hospital room, bedroom, or living room. The computerized patient monitoring system 206 may be connected to a central video monitoring system 210. The computerized patient monitoring system 206 and central video monitoring system 210 may be remotely located at any physical locations so long as a data connection exists (USB, TCP/IP or comparable) between the computerized patient monitoring system 206, the central video monitoring system 210, and the 3D motion sensor(s) 204.

Computerized patient monitoring system 206 may assign reference points to identify the boundaries of an area to be monitored. For example, reference points may be assigned to a perimeter around the patient. It should be understood that the selection of the reference points may vary with the individual and/or the configuration of the monitoring system 200. Reference points may be configured automatically by the system 200, may be configured automatically by the system 200 subject to confirmation and/or modification by a system user, or may be configured manually by a system user.

Data associated with objects or patient safety events may be logged by computerized patient monitoring system 206 and/or central video monitoring system 210 in a database 216. Data associated with the objects or patient safety events may include, without limitation, the telemetry data from 3D motion sensor 204 that triggered the object or patient safety event; buffered data preceding the telemetry data that triggered the object or patient safety event; telemetry data subsequent to the object or patient safety event; the number and substantive content of object or patient safety event; the individual(s) and/or groups to whom the object or patient safety event was addressed; the response, if any, received or observed following the object or patient safety event; and combinations thereof. In some embodiments, data associated with the object or patient safety event may include the video and/or pictures of the object or patient safety event.

Figure 3:
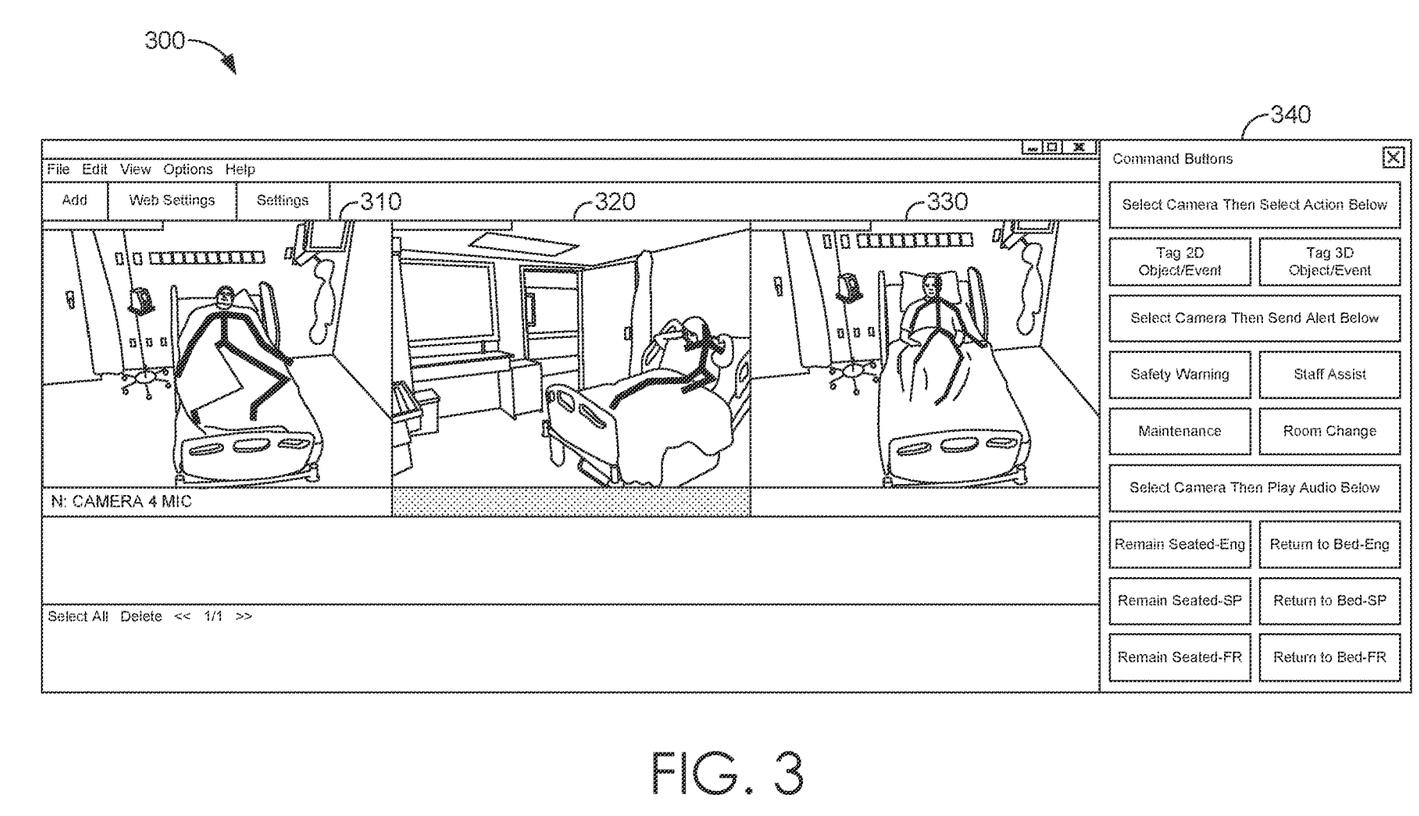
FIG. 3 is an exemplary display for object or patient safety event detection in a patient room, in accordance with embodiments of the present disclosure.

FIG. 3 shows an exemplary view for central video monitoring system 300, in accordance with embodiments of the present disclosure. More particularly, the central video monitoring system 300 displays patient safety event detection in a patient room. The view includes skeletal figures, which may be identified by central video monitoring system, and used to track or "lock on to" a patient. Although skeletal figures are shown in FIG. 3, alternate image analysis could be used, including, without limitation, blob recognition, bounding boxes, person masks, and facial recognition or object recognition. As illustrated, a user may be watching live or recorded video 310, 320, 330. If the user sees an object or event that the user wants the system to learn, the user can select the appropriate button (e.g., Tag 2D Object/Event or Tag 3D Object/Event) to indicate to the system that the user wants to store the video immediately before and after the time the user hit the button to send to the patient safety learning system. The patient safety learning system is capable of buffering video and depth data for the user to enable this process. The user is additionally provided an opportunity to include additional information parameters about the object or safety event, as shown in FIG. 4, described below.

Figure 4:
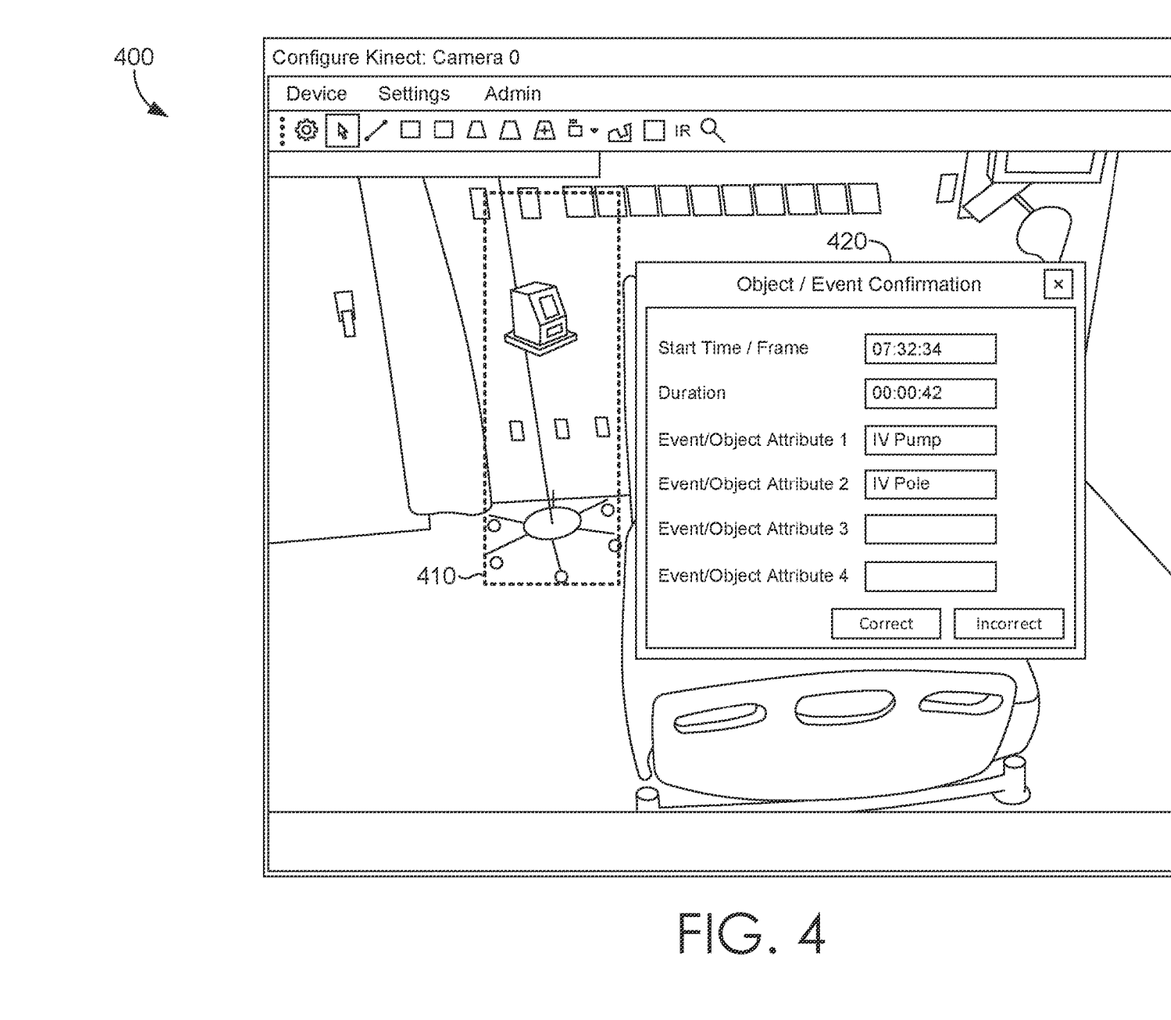
FIG. 4 is an exemplary display for object or patient safety event confirmation in a patient room, in accordance with embodiments of the present disclosure.

FIG. 4 shows an exemplary view for central video monitoring system 400, in accordance with embodiments of the present disclosure. More particularly, the central video monitoring system 400 displays object detection in a patient room (although illustrated in FIG. 4 and described with respect to object detection, the same process is used for patient safety events). As illustrated, an object 410 has been detected or identified by a user. Upon selecting the object 410, a user can add additional parameters 420 corresponding to the object 410. The objects and additional parameters are communicated to a patient safety learning system to enhance safety issue recognition capabilities of the system and reduce false alerts.

Figure 5:
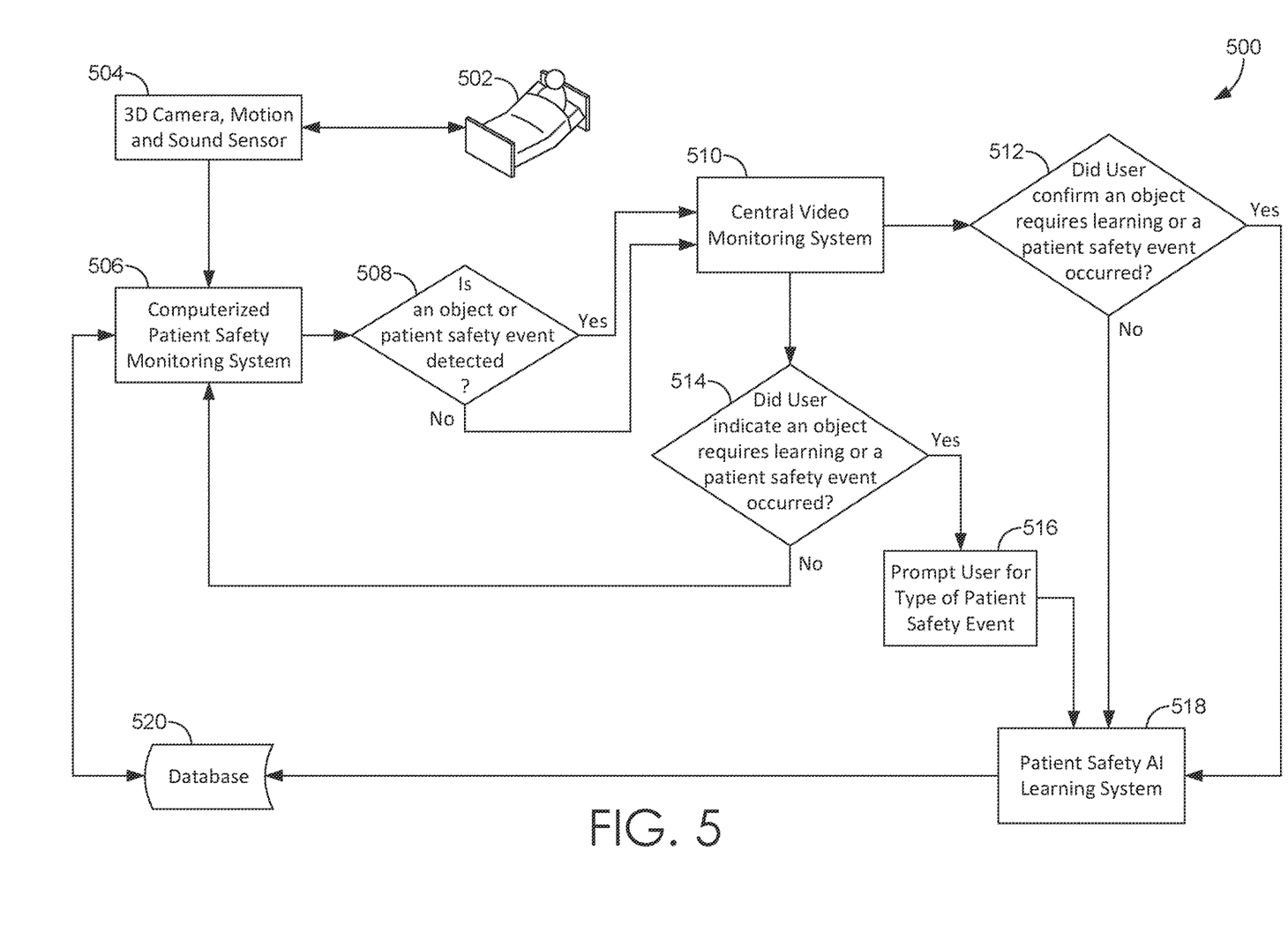
FIG. 5 is an exemplary flowchart for a semi-automated learning process to detect objects or patient safety events in a patient room, in accordance with embodiments of the present disclosure.

In FIG. 5, a semi-automated learning process detects objects or patient safety events in a patient room, in accordance with embodiments of the present disclosure. The system 500 may be utilized to collect a series of images and depth data in the room of a patient 502. For example, 3D motion sensor 504 may detect an object (e.g., medication, food, beverage, drug paraphernalia, tobacco products, and the like) in the room of the patient. Additionally, or alternatively, 3D motion sensor 504 may detect a patient safety event (e.g., the patient getting out of bed). Computerized patient safety monitoring system 506 is communicatively coupled to the 3D motion sensor 504 and receives data (i.e., the series of images relevant to the object or patient safety issue) from the 3D motion sensor 504. Features of the object or patient safety event may be analyzed by computerized patient safety monitoring system 506 and compared to stored data in a database 520 to identify known issues, patterns, and the like that can be used to detect an object or patient safety event.

As shown at step 508, images from the computerized patient safety monitoring system 506 are communicated for display on the central video monitoring system 510 regardless of whether an object or patient safety event is detected. However, when an object or patient safety event is detected, a user is prompted, as shown at step 512, to confirm the object requires learning (if not already known by the system 500) or to confirm the patient safety event occurred. Either way, the data is communicated to a patient safety learning system 518. The patient safety learning system 518 incorporates the response by the user so the object or patient safety event can be learned and stored in database 520. This semi-automated learning process enhances the safety issue recognition capabilities of the system and reduces false alerts. If, on the other hand, the object does not require learning or the patient safety event did not occur, no further action is taken and the computerized patient safety monitoring system 506 continues to wait for data received by the 3D sensor 504.

Additionally, or alternatively, if the system does not detect an object or patient safety event, the user may indicate, as shown at step 514, that an object requires learning (if not already known by the system 500) or that a patient safety event occurred. If the user indicates that an object requires learning or that a patient safety event occurred, the user may be prompted, as shown at step 516, to indicate parameters of the object or the type of patient safety event. This information, along with the data (which may include a recording prior (using data buffering), during, and after the object or patient safety event was detected), is communicated to a patient safety learning system 518. The patient safety learning system 518 incorporates the parameters or type of event indicated by the user with the data so the object or patient safety event can be learned and stored in database 520. This semi-automated learning process enhances the safety issue recognition capabilities of the system and reduces false alerts. If, on the other hand, the user indicates that the object does not require learning or the patient safety event did not occur, no further action is taken and the computerized patient safety monitoring system 506 continues to wait for data received by the 3D sensor 504.

Figure 6:
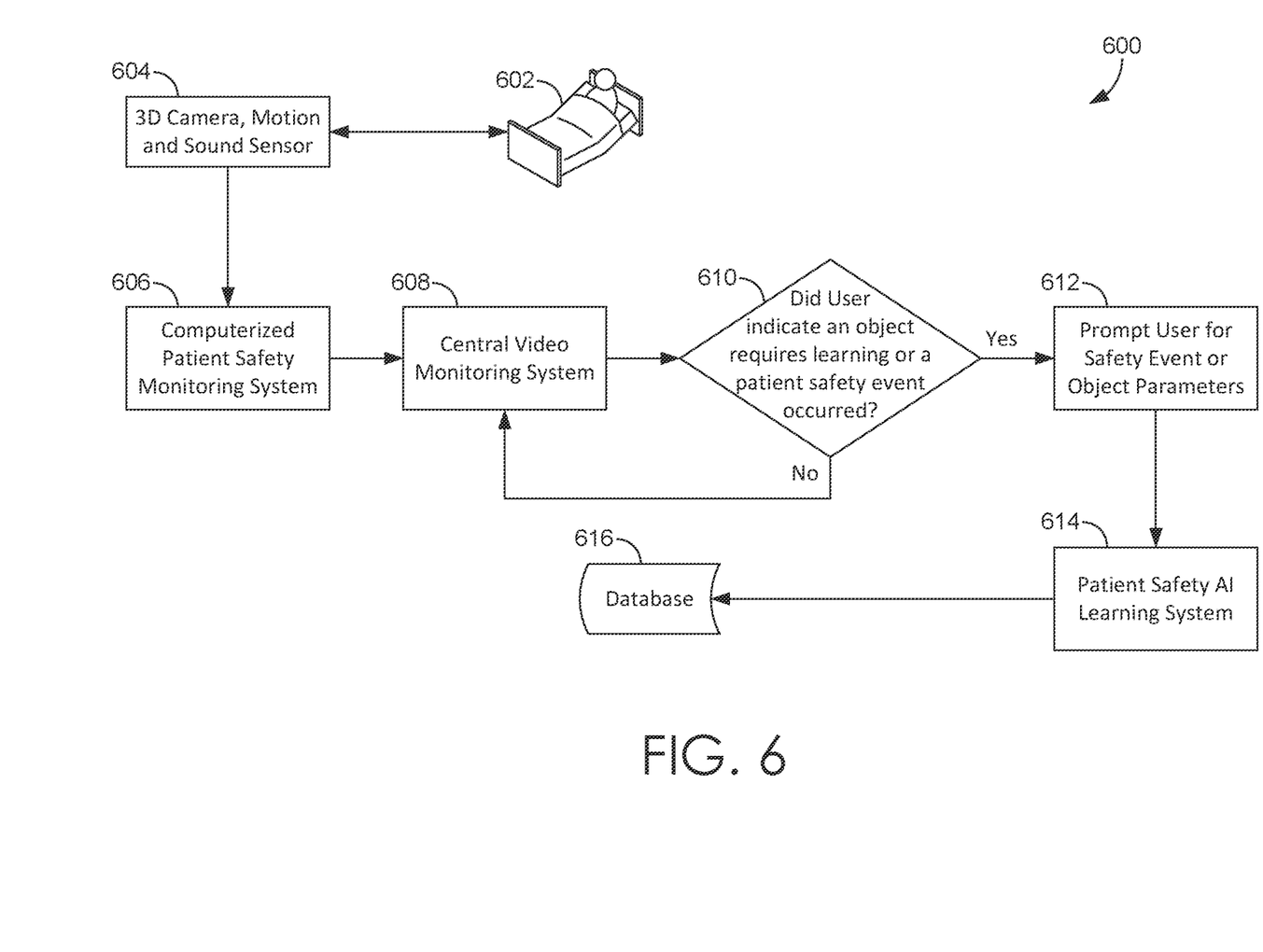
FIG. 6 is an exemplary flowchart for a manually initiated learning process to detect objects or patient safety events in a patient room, in accordance with embodiments of the present disclosure.

Referring now to FIG. 6, a manually initiated learning process detects objects or patient safety events in a patient room, in accordance with embodiments of the present disclosure. In FIG. 6, the system 600 may be utilized to collect a series of images and depth data in the room of a patient 602. For example, 3D motion sensor 604 may collect images of an object (e.g., medication, food, beverage, drug paraphernalia, tobacco products, and the like) in the room of the patient. Additionally, or alternatively, 3D motion sensor 604 may collect images of a patient safety event (e.g., the patient getting out of bed). Computerized patient safety monitoring system 606 is communicatively coupled to the 3D motion sensor 604 and receives data (i.e., the series of images relevant to the object or patient safety issue) from the 3D motion sensor 604. A constant stream of images is communicated by computerized patient safety monitoring system 606 for display on the central video monitoring system 610.

As shown at step 608, images from the computerized patient safety monitoring system 606 are communicated for display on the central video monitoring system 610. As shown at step 610, to indicate an object requires learning or to indicate a patient safety event occurred. If the user indicates that an object requires learning or that a patient safety event occurred, the user may be prompted, as shown at step 612, to indicate parameters of the object or the type of patient safety event. This information, along with the data (which may include a recording prior (using data buffering), during, and after the object or patient safety event was detected), is communicated to a patient safety learning system 614. The patient safety learning system 614 incorporates the parameters or type of event indicated by the user with the data so the object or patient safety event can be learned and stored in database 616. This semi-automated learning process enhances the safety issue recognition capabilities of the system and reduces false alerts. If, on the other hand, the user does not indicate that an object requires learning or that a patient safety event occurred, no further action is taken and the central video monitoring system 608 continues to display data received by the computerized patient safety monitoring system 606.

As noted, the patient safety learning system may utilize one or more machine learning algorithms to determine if an object or patient safety event is detected. For example, an ensemble of alternating decision trees can be used to determine if an object or patient safety event is detected. Each decision tree may be trained on a random subset of objects and patient safety events. In some embodiments, the number of decision trees used is based on the type of healthcare data received or specific information pertaining to the patient.

A generic decision tree is a decision support tool which arrives at a decision after following steps or rules along a tree-like path. While most decision trees are only concerned about the final destination along the decision path, alternating decision trees take into account every decision made along the path and may assign a score for every decision encountered. Once the decision path ends, the algorithm sum all of the incurred scores to determine a final classification (i.e., information that should be grouped and displayed together). In some embodiments, the alternating decision tree algorithm may be further customized. For example, the alternating decision tree algorithm may be modified by wrapping it in other algorithms.

A machine learning algorithm may use a generic cost matrix. The intuition behind the cost matrix is as follows. If the model predicts a member to be classified in group A, and the member really should be in group A, no penalty is assigned. However, if this same member is predicted to be in group B, C, or D, a 1-point penalty will be assigned to the model for this misclassification, regardless of which group the member was predicted to be in. Thus, all misclassifications are penalized equally. However, by adjusting the cost matrix, penalties for specific misclassifications can be assigned. For example, where someone who was truly in group D was classified in group A, the model could increase the penalty in that section of the cost matrix. A cost matrix such as this may be adjusted as needed to help fine tune the model for different iterations, and may be based on the specific patient in some embodiments.

With regards to a multi-class classifier, some machine learning algorithms, such as alternating decision trees, generally only allow for the classification into two categories (e.g. a binary classification). In cases where it is desired to classify three or more categories, a multi-class classifier is used.

In order to assist the alternating decision tree in selecting best features for predictive modeling, an ensemble method called rotation forest may be used. The rotation forest algorithm randomly splits the dataset into a specified number of subsets and uses a clustering method called Principal Component Analysis to group features deemed useful. Each tree is then gathered (i.e., "bundled into a forest") and evaluated to determine the features to be used by the base classifier.

Various alternative classifiers may be used to provide the medical and preventive healthcare personal assistant services. Indeed, there are thousands of machine learning algorithms, which could be used in place of, or in conjunction with, the alternating decision tree algorithm. For example, one set of alternative classifiers comprise ensemble methods.

Ensemble methods use multiple, and usually random, variations of learning algorithms to strengthen classification performance. Two of the most common ensemble methods are bagging and boosting. Bagging methods, short for "bootstrap aggregating" methods, develop multiple models from random subsets of features from the data ("bootstrapping"), assigns equal weight to each feature, and selects the best-performing attributes for the base classifier using the aggregated results. Boosting, on the other hand, learns from the data by incrementally building a model, thereby attempting to correct misclassifications from previous boosting iterations.

Regression models are frequently used to evaluate the relationship between different features in supervised learning, especially when trying to predict a value rather than a classification. However, regression methods are also used with other methods to develop regression trees. Some algorithms combine both classification and regression methods; algorithms that used both methods are often referred to as CART (Classification and Regression Trees) algorithms.

Bayesian statistical methods are used when the probability of some events happening are, in part, conditional to other circumstances occurring. When the exact probability of such events is not known, maximum likelihood methods are used to estimate the probability distributions. A textbook example of Bayesian learning is using weather conditions, and whether a sprinkler system has recently gone off, to determine whether a lawn will be wet. However, whether a homeowner will turn on their sprinkler system is influenced, in part, to the weather. Bayesian learning methods, then, build predictive models based on calculated prior probability distributions.

Another type of classifiers comprise artificial neural networks. While typical machine learning algorithms have a pre-determined starting node and organized decision paths, the structure of artificial neural networks are less structured. These algorithms of interconnected nodes are inspired by the neural paths of the brain. In particular, neural network methods are very effective in solving difficult machine learning tasks. Much of the computation occurs in "hidden" layers.

By way of example and not limitation, other classifiers and methods that may be utilized include (1) decision tree classifiers, such as: C4.5—a decision tree that first selects features by evaluating how relevant each attribute is, then using these attributes in the decision path development; Decision Stump—a decision tree that classifies two categories based on a single feature (think of a single swing of an axe); by itself, the decision stump is not very useful, but becomes more so paired with ensemble methods; LADTree—a multi-class alternating decision tree using a LogitBoost ensemble method; Logistic Model Tree (LMT)—a decision tree with logistic regression functions at the leaves; Naive Bayes Tree (NBTree)—a decision tree with naive Bayes classifiers at the leaves; Random Tree—a decision tree that considers a pre-determined number of randomly chosen attributes at each node of the decision tree; Random Forest—an ensemble of Random Trees; and Reduced-Error Pruning Tree (REPTree)—a fast decision tree learning that builds trees based on information gain, then prunes the tree using reduce-error pruning methods; (2) ensemble methods such as: AdaBoostM1—an adaptive boosting method; Bagging—develops models using bootstrapped random samples, then aggregates the results and votes for the most meaningful features to use in the base classifier; LogitBoost—a boosting method that uses additive logistic regression to develop the ensemble; MultiBoostAB—an advancement of the AdaBoost method; and Stacking—a method similar to boosting for evaluating several models at the same time; (3) regression methods, such as Logistic Regression—regression method for predicting classification; (4) Bayesian networks, such as BayesNet—Bayesian classification; and NaiveBayes—Bayesian classification with strong independence assumptions; and (4) artificial neural networks such as MultiLayerPerception—a forward-based artificial neural network.

The various computerized systems and processors as described herein may include, individually or collectively, and without limitation, a processing unit, internal system memory, and a suitable system bus for coupling various system components, including database 118, with a control server. Computerized patient monitoring system 106 and/or central video monitoring system 116 may provide control server structure and/or function. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus.

The computerized systems typically include therein, or have access to, a variety of computer-readable media, for instance, database 118. Computer-readable media can be any available media that may be accessed by the computerized system, and includes volatile and nonvolatile media, as well as removable and non-removable media. By way of example, and not limitation, computer-readable media may include computer-storage media and communication media. Computer-readable storage media may include, without limitation, volatile and nonvolatile media, as well as removable and non-removable media implemented in any method or technology for storage of information, such as computer readable instructions, data structures, program modules, or other data. In this regard, computer-storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server. Computer-readable storage media excludes signals per se.

Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media. The computer-readable storage media discussed above, including database 118, provide storage of computer readable instructions, data structures, program modules, and other data for the computerized systems. Computer readable instructions embodied on computer-readable storage media may be accessible by prohibited object system 100 and/or component(s) thereof, and, when executed by a computer processor and/or server, may cause the system to function and/or perform the methods described herein.

The computerized systems may operate in a computer network using logical connections to one or more remote computers. Remote computers may be located at a variety of locations, for example, but not limited to, hospitals and other inpatient settings, veterinary environments, ambulatory settings, medical billing and financial offices, hospital administration settings, home health care environments, payer offices (e.g., insurance companies), home health care agencies, clinicians' offices and the clinician's home or the patient's own home or over the Internet. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, laboratory technologists, genetic counselors, researchers, veterinarians, students, and the like. The remote computers may also be physically located in non-traditional medical care environments so that the entire health care community may be capable of integration on the network. The remote computers may be personal computers, servers, routers, network PCs, peer devices, other common network nodes, or the like, and may include some or all of the elements described above in relation to the control server. The devices can be personal digital assistants or other like devices.

Exemplary computer networks may include, without limitation, local area networks (LANs) and/or wide area networks (WANs). Such networking environments are commonplace in offices, enterprise-wide computer networks, intranets, and the Internet. When utilized in a WAN networking environment, the control server may include a modem or other means for establishing communications over the WAN, such as the Internet. In a networked environment, program modules or portions thereof may be stored in the control server, in the database 118, or on any of the remote computers. For example, and not by way of limitation, various application programs may reside on the memory associated with any one or more of the remote computers. It will be appreciated by those of ordinary skill in the art that the network connections shown are exemplary and other means of establishing a communications link between the computers may be utilized.

In operation, a user may enter commands and information into the computerized system(s) using input devices, such as a keyboard, a pointing device (commonly referred to as a mouse), a trackball, a touch pad, a 3D Gesture recognition camera or motion sensor. Other input devices may include, without limitation, microphones, satellite dishes, scanners, or the like. In addition to or in lieu of a monitor, the computerized systems may include other peripheral output devices, such as speakers and a printer.

Many other internal components of the computerized system hardware are not shown because such components and their interconnection are well known. Accordingly, additional details concerning the internal construction of the computers that make up the computerized systems are not further disclosed herein.

Methods and systems of embodiments of the present disclosure may be implemented in a WINDOWS or LINUX operating system, operating in conjunction with an Internet-based delivery system, however, one of ordinary skill in the art will recognize that the described methods and systems can be implemented in any operating system suitable for supporting the disclosed processing and communications. As contemplated by the language above, the methods and systems of embodiments of the present invention may also be implemented on a stand-alone desktop, personal computer, cellular phone, smart phone, tablet computer, PDA, or any other computing device used in a healthcare environment or any of a number of other locations.

From the foregoing, it will be seen that this disclosure is well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A system for utilizing artificial intelligence to detect patient safety events for a monitored individual, the system comprising:
   one or more motion sensors located to collect a series of images of at least one area associated with a monitored individual;
   a computerized patient safety monitoring system communicatively coupled to the one or more motion sensors, the computerized patient safety monitoring system receiving data from the one or more motion sensors and utilizing the data to identify a patient safety event;
   a central video monitoring system that:
   receives one or more of the series of images of the patient safety event from the computerized patient safety monitoring system; and
   upon receiving a confirmation of the patient safety event, creates a recording of the patient safety event prior, during, and after the patient safety event was detected; and
   a patient safety learning system that analyzes the data and incorporates the confirmation of the patient safety event.

2. The system of claim 1, wherein the recording of the patient safety event is created by the central video monitoring system prior to using data buffering.

3. The system of claim 1, wherein the recording and the patient safety event are communicated to the patient safety learning system.

4. The system of claim 1, wherein the central video monitoring system includes a prompt for input of additional parameters to the patient safety event.

5. The system of claim 1, wherein if no patient safety event is detected, the computerized patient safety monitoring system communicates live images of the data to the central video monitoring system for a user to view.

6. The system of claim 1, wherein the monitored individual is represented using skeletal tracking.

7. A method for utilizing artificial intelligence to detect patient safety events for a monitored individual, the method comprising:
   utilizing one or more motion sensors to collect a series of images of at least one area associated with a monitored individual;
   receiving data from the one or more motion sensors at a computerized patient safety monitoring system, the computerized patient safety monitoring system communicatively coupled to the one or more motion sensors;
   receiving, by a central video monitoring system, one or more of the series of images of a patient safety event from the computerized patient safety monitoring system;
   upon receiving a confirmation of the patient safety event, creating a recording of the one or more of the series of images prior to, during, and after detection of the patient safety event; and
   analyzing, by a patient safety learning system, the data and incorporating the confirmation of the patient safety event that occurred.

8. The method of claim 7, further comprising communicating the recording and an identification of the patient safety event to the patient safety learning system.

9. The method of claim 7, further comprising storing, by a database, new or modified lessons learned by the patient safety learning system.

10. The method of claim 7, further comprising, if no patient safety event is identified by a user, communicating, by the computerized patient safety monitoring system, the series of images of the data to the central video monitoring system for the user to view, wherein the series of images are live images.

11. The method of claim 7, wherein the monitored individual is represented using skeletal tracking.

12. The method of claim 7, wherein the at least one area to be monitored is a residential environment.

13. A method for utilizing artificial intelligence to detect patient safety events for a monitored individual, the method comprising:

utilizing one or more motion sensors to collect a series of images of at least one area associated with a monitored individual, wherein the monitored individual is represented using skeletal tracking;

receiving data from the one or more motion sensors at a computerized patient safety monitoring system, the computerized patient safety monitoring system communicatively coupled to the one or more motion sensors;

receiving, by a central video monitoring system, one or more of the series of images of a patient safety event from the computerized patient safety monitoring system;

upon receiving a confirmation of the patient safety event, creating a recording of the one or more of the series of images prior to, during, and after detection of the patient safety event; and analyzing, by a patient safety learning system, the data and incorporating the confirmation of the patient safety event.

14. The method of claim 13, wherein the at least one area to be monitored is a residential environment.

15. The method of claim 13, further comprising storing, by a database, new or modified lessons learned by the patient safety learning system.

16. The method of claim 13, further comprising communicating the recording to the patient safety learning system.

17. The method of claim 16, further comprising communicating an identification of the patient safety event and any additional parameters added by a user to the patient safety learning system.

* * * * *